(12) United States Patent
Carbonero

(10) Patent No.: US 10,773,146 B1
(45) Date of Patent: Sep. 15, 2020

(54) PLAYGROUND CONE WITH SLOTS

(71) Applicant: Pull-Buoy, Inc., Sterling Heights, MI (US)

(72) Inventor: Kurt K. Carbonero, Mt. Pleasant, SC (US)

(73) Assignee: Pull-Buoy, Inc., Sterling Heights, MI (US)

( * ) Notice: Subject to any disclaimer, the term of this patent is extended or adjusted under 35 U.S.C. 154(b) by 0 days.

(21) Appl. No.: 16/367,953

(22) Filed: Mar. 28, 2019

(51) Int. Cl.
*A63B 71/02* (2006.01)
*F16M 11/04* (2006.01)
*F16M 13/00* (2006.01)
*F16M 11/22* (2006.01)

(52) U.S. Cl.
CPC ......... *A63B 71/023* (2013.01); *F16M 11/041* (2013.01); *F16M 11/22* (2013.01); *F16M 13/00* (2013.01); *F16M 2200/027* (2013.01); *F16M 2200/08* (2013.01)

(58) Field of Classification Search
CPC .......... A63B 71/023; A63B 2069/0004; A63B 2069/401; F16M 11/041; F16M 11/22; F16M 13/00; F16M 2200/027; F16M 2200/08
See application file for complete search history.

(56) References Cited

U.S. PATENT DOCUMENTS

| | | | | |
|---|---|---|---|---|
| 300,115 A | * | 6/1884 | Obert | E04H 17/16 256/19 |
| 2,662,518 A | * | 12/1953 | Luthi | A63F 9/02 124/17 |
| 3,707,320 A | * | 12/1972 | Brynes | E01F 9/688 116/63 P |
| 4,772,869 A | * | 9/1988 | Grammas | B60Q 7/00 116/63 C |
| 5,305,705 A | * | 4/1994 | Gagliano | E01F 9/654 116/63 P |
| 5,375,554 A | * | 12/1994 | Yen | B60Q 7/005 116/63 C |
| 5,536,222 A | * | 7/1996 | Banda | A63B 21/078 482/148 |
| 5,566,638 A | * | 10/1996 | Rokosny | E01F 9/688 116/63 C |
| 5,669,833 A | * | 9/1997 | Stone | A63B 69/002 434/251 |
| 6,053,824 A | * | 4/2000 | Boudreaux | A63B 9/00 473/440 |
| 6,386,135 B1 | * | 5/2002 | Oshima | E01F 13/02 116/63 C |

(Continued)

*Primary Examiner* — Melba Bumgarner
*Assistant Examiner* — Amir A Klayman
(74) *Attorney, Agent, or Firm* — Howard & Howard Attorneys PLLC

(57) ABSTRACT

A playground cone may be molded from vinyl or other plastic material, and includes a base portion and a frustoconical portion. The frustoconical portion extends upwardly from the base portion to a top of the frustoconical portion. The frustoconical portion may define a hollow, interior section. The frustoconical portion further includes a slot defined in a wall. The slot may be a vertical slot and/or one or more horizontal slots. The slot, being vertical and/or horizontal, may be adapted to secure a playground hoop or crossbar within the frustoconical portion of the playground cone.

4 Claims, 5 Drawing Sheets

(56) References Cited

U.S. PATENT DOCUMENTS

| | | | | |
|---|---|---|---|---|
| 7,669,945 B2 * | 3/2010 | Blersch | ................ | F25D 23/067 |
| | | | | 108/107 |
| 7,690,321 B2 * | 4/2010 | Karow | ................... | E01F 13/02 |
| | | | | 116/63 P |
| 7,717,376 B2 * | 5/2010 | Sparks, Jr. | ................ | F16B 7/18 |
| | | | | 248/145 |
| D672,222 S * | 12/2012 | Bucci | ............................ | D8/354 |
| 9,713,760 B2 * | 7/2017 | Peacock | ............... | A63C 19/062 |
| 2004/0159280 A1 * | 8/2004 | Mohelsky | ............ | A63C 19/062 |
| | | | | 116/63 C |
| 2008/0111312 A1 * | 5/2008 | Longo | ................... | A63B 67/06 |
| | | | | 273/402 |
| 2009/0226252 A1 * | 9/2009 | Field | ................... | E01F 13/028 |
| | | | | 404/6 |
| 2015/0258400 A1 * | 9/2015 | Yamamoto | ........... | A63B 67/002 |
| | | | | 473/470 |
| 2019/0366179 A1 * | 12/2019 | Holland | ................ | A63B 22/00 |

* cited by examiner

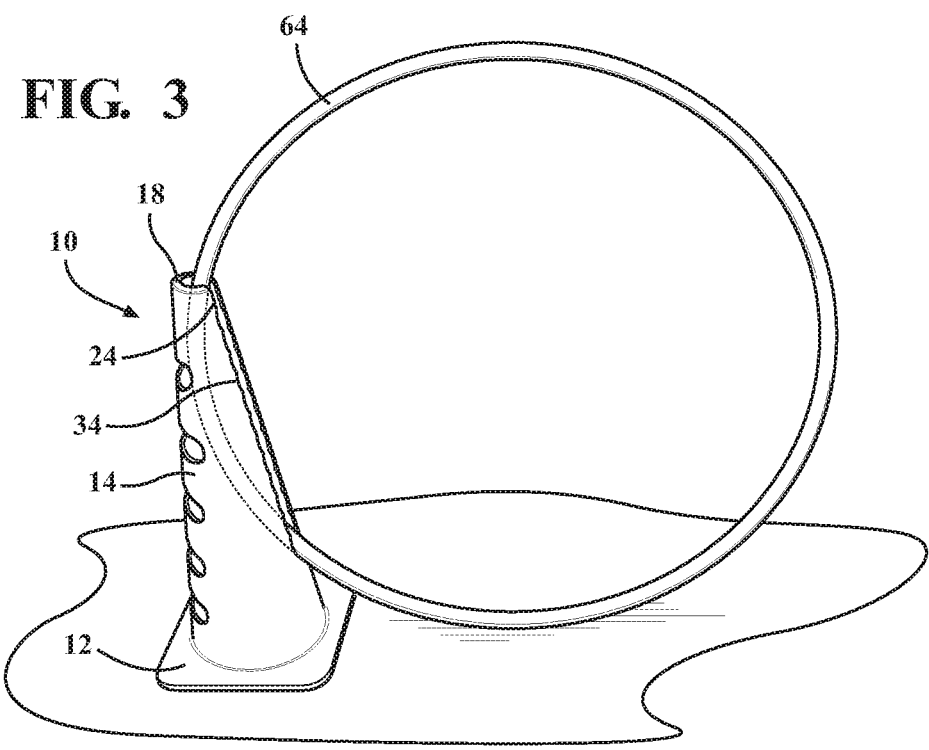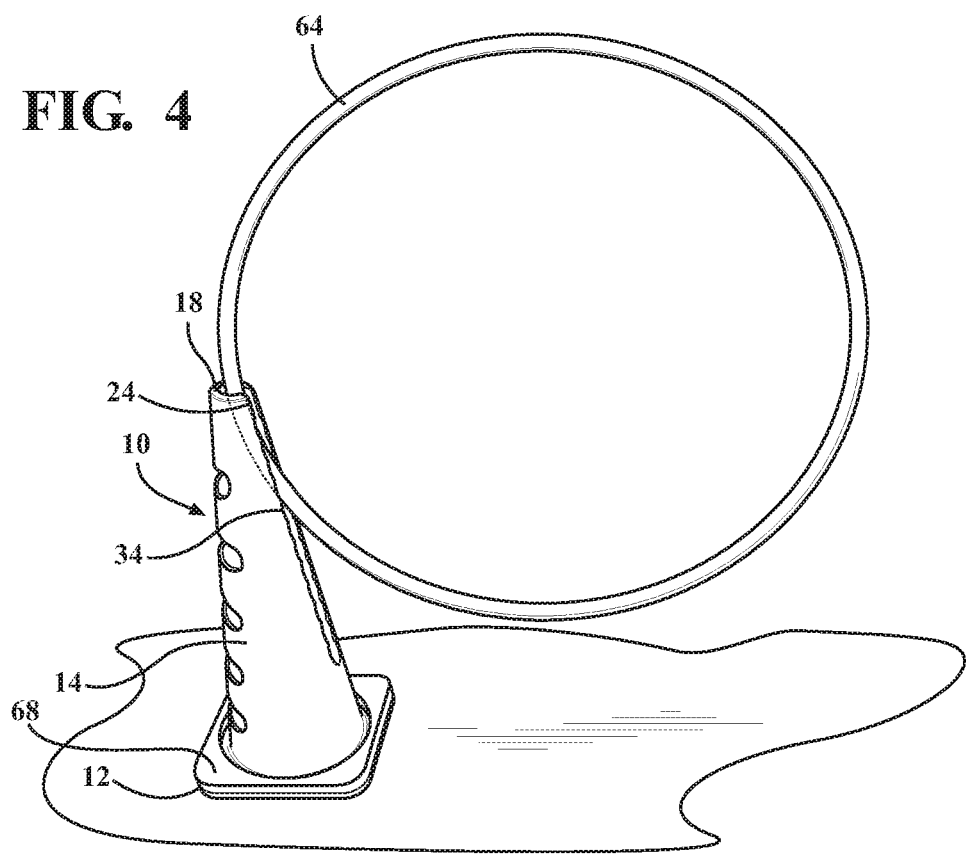

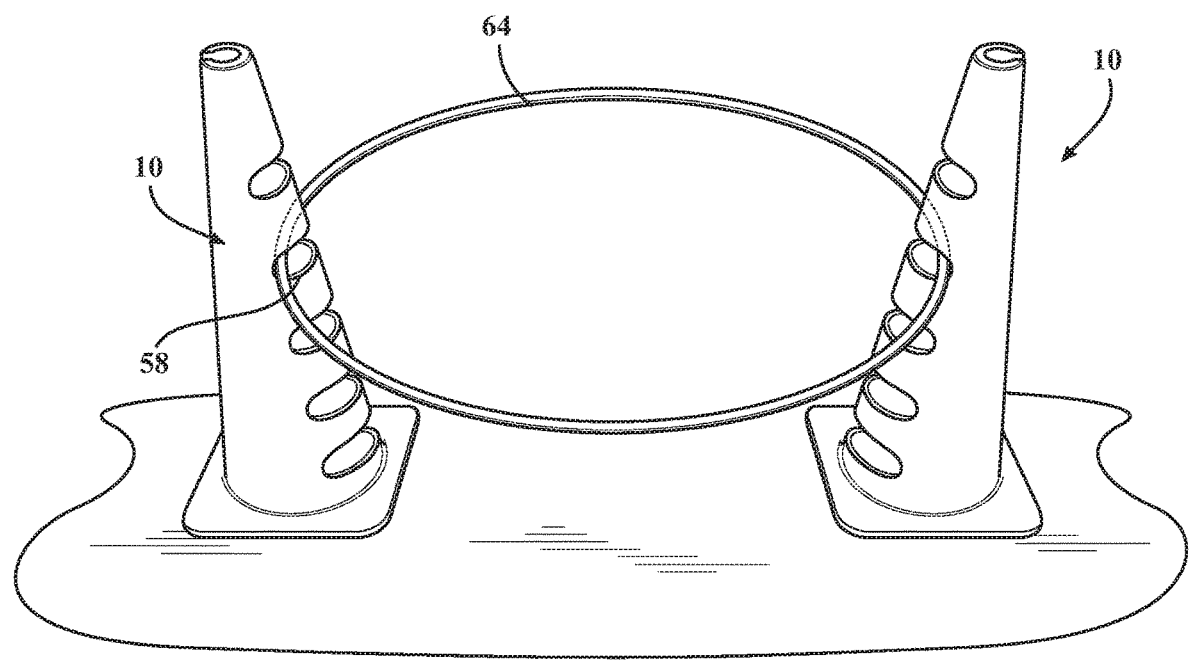
FIG. 5
FIG. 6
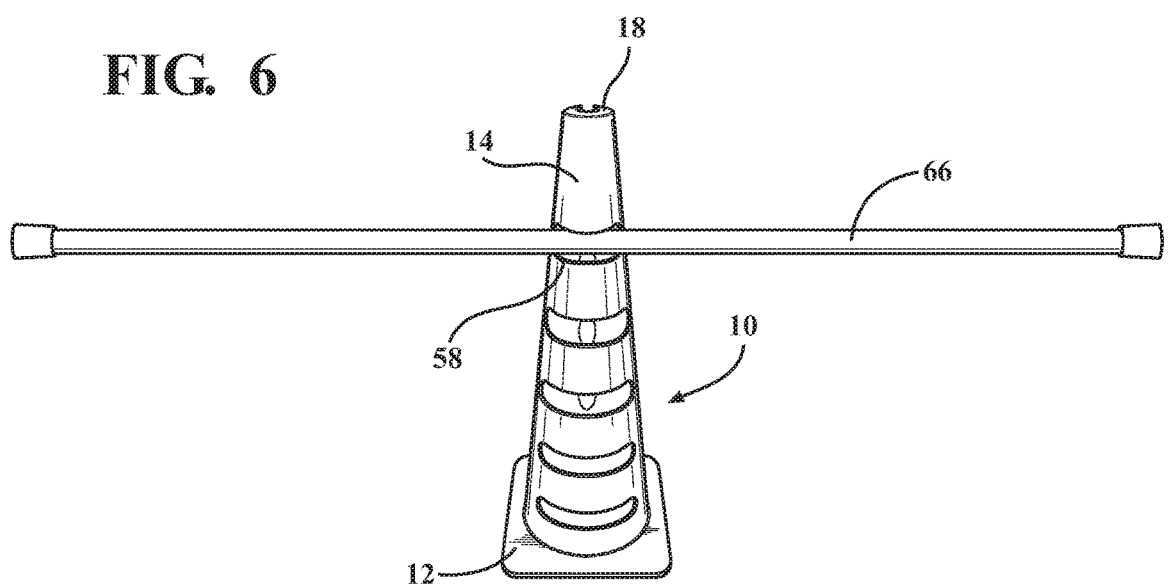

PLAYGROUND CONE WITH SLOTS

BACKGROUND OF THE INVENTION

It is common to use common "traffic"-type cones in a playground or gym class situation for game and physical education purposes. The inventor of the present invention has devised a variety of products in the past that expand the uses for cones in these environments. He has patented several inventions with U.S. Pat. No. 5,025,799 (Telescoping Hurdle With Base Adapter) and U.S. Pat. No. 6,543,777 (Base for Game Standard). Cones can support a variety of other activities, too, because they are durable, inexpensive and versatile.

At the same time, there is a need to mount common playground hoops in a variety of configurations for games and physical education. People skilled with gym equipment and sporting goods are familiar with playground hoops and their uses for recreational and physical education purposes. These hoops can also be placed on the ground in various positions to facilitate different playground games. The playground hoops provide circular spaces on the floor, forming the basis for many playground games. But used alone, these hoops may only be used flat on the ground unless someone holds the hoop above the ground in a given position.

The user's hoop-positioning options are limited by the horizontal hoop-orientation; and to have someone hold the hoop can be inconvenient. Additionally, common playground hoops are usually fashioned from hard plastic. Firmly linking hoops and hoop-holding devices is difficult because of hard plastic's low coefficient of friction. Even with small tolerances between the playground hoop and hoop-holding device, the slightest disturbance will move the hoop relative to the hoop-holding device.

Standard commercial playground hoops are made from tubular material having diameters that range from approximately ½" to 1". The hoops form circles that have diameters ranging from 20" to 36". Achieving a reasonable fit between a hoop-holding device and various playground hoop diameters in the past required the hoop-holding device diameter to be matched with the diameter of the particular hoop being held. Users of playground hoops often include school gym teachers who constantly replace broken or damaged hoops. Finding inexpensive replacement hoops is difficult because one must find the exact hoop diameter of the hoop holder. Purchasing multiple hoop-holding devices for each hoop diameter would allow owners to purchase a greater variety of hoop sizes. But this solution is expensive and impractical, requiring extra money to purchase additional hoop-holding devices, extra time to coordinate appropriately-sized hoops and hoop-holders and extra storage space for housing the equipment.

The present inventor has addressed those needs with patented inventions including U.S. Pat. No. 6,543,777 (Base for Game Standard) and U.S. Pat. No. 8,172,636 (Playground Hoop-Holding Apparatus). Still, there is a need for yet even more improvements to common playground equipment to expand the list of options for games and physical education.

SUMMARY OF THE INVENTION

The present design makes it possible for hoops to be supported by the cones in both a perpendicular (vertical) and parallel (horizontal) position to the playing surface. The cones become support bases (stanchions) for the hoops, and for crossbars, too.

Other objects, features and advantages of the present invention will be readily appreciated as the same becomes better understood after reading the subsequent description taken in connection with the accompanying drawings.

In one embodiment, a playground cone includes a flat base portion, and a hollow frustoconical portion. The hollow frustoconical portion extends upwardly from the base portion toward a top end of the playground cone. The frustoconical portion defines an elongated slot extending from a first end to a second end. The slot is adapted to receive a playground hoop and support the playground hoop in a predetermined orientation relative to the ground.

In another embodiment, a playground cone includes a flat base portion and a hollow frustoconical portion. The hollow frustoconical portion extends upwardly from the base portion toward a top end of the playground cone. The frustoconical portion defines an elongated vertical slot extending from the top end downwardly toward the base. The vertical slot is adapted to receive a playground hoop.

In a further embodiment, a playground cone includes a flat base portion and a hollow frustoconical portion. The frustoconical portion extends upwardly from the base portion toward a top end of the playground cone. The frustoconical portion defines a series of oval-shaped holes oriented in a vertical direction. The oval-shaped holes each include a bottom end and a top end. The bottom end of one oval overlaps the top end of another to define an elongated vertical slot extending from a predetermined distance above the base portion to the top end of the playground cone.

In yet another embodiment, a playground cone includes a flat base portion and a hollow frustronical portion. The frustoconical portion extends upwardly from the base portion toward a top end of the playground cone. The frustoconical portion defines a hole through the top end of the playground cone. The frustoconical portion defines a vertical slot having a perimeter of scallops, with the slot extending from the top end down toward the base.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is an elevated perspective view of the same embodiment of the invention shown supporting a hoop in a vertical orientation;

FIG. 4 is an elevated perspective view of the same embodiment together with a weight shown supporting a hoop in a different vertical orientation with the hoop supported above the ground;

FIG. 5 is an elevated perspective view of the same embodiment of the invention showing two cones supporting a hoop in a horizontal orientation;

FIG. 6 is an elevated perspective view of the same embodiment of the invention shown supporting a pole in a horizontal orientation;

DETAILED DESCRIPTION OF THE INVENTION

Figure 1:
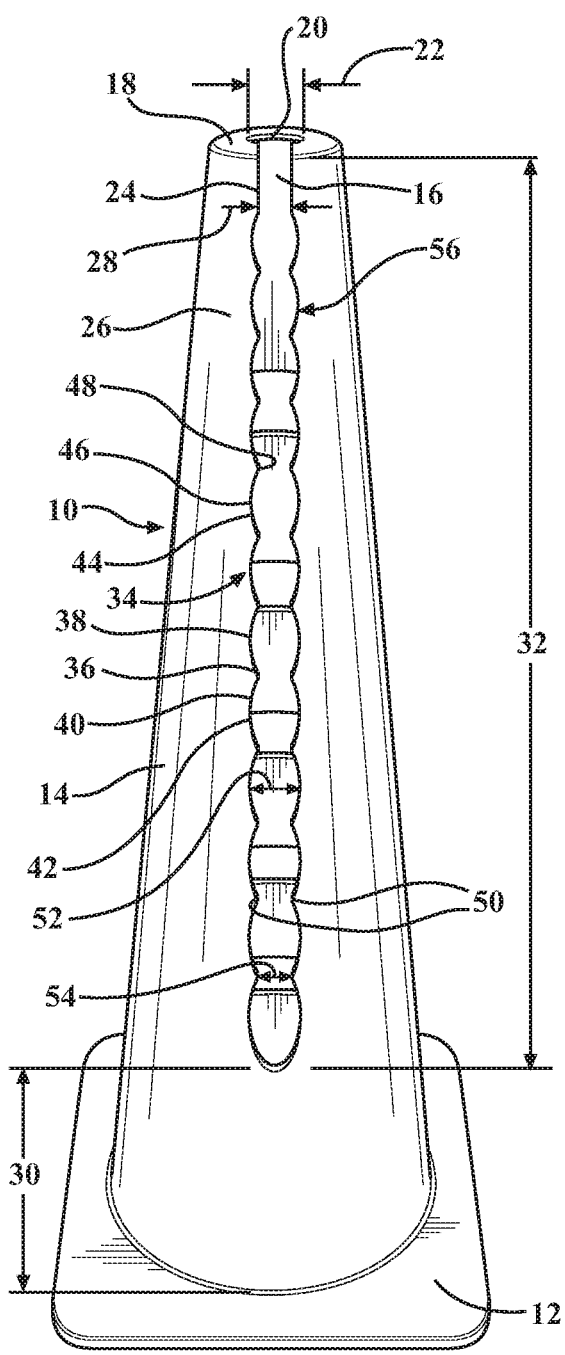
FIG. 1 is a front view of an embodiment of the invention showing a vertical slot.
Figure 2:
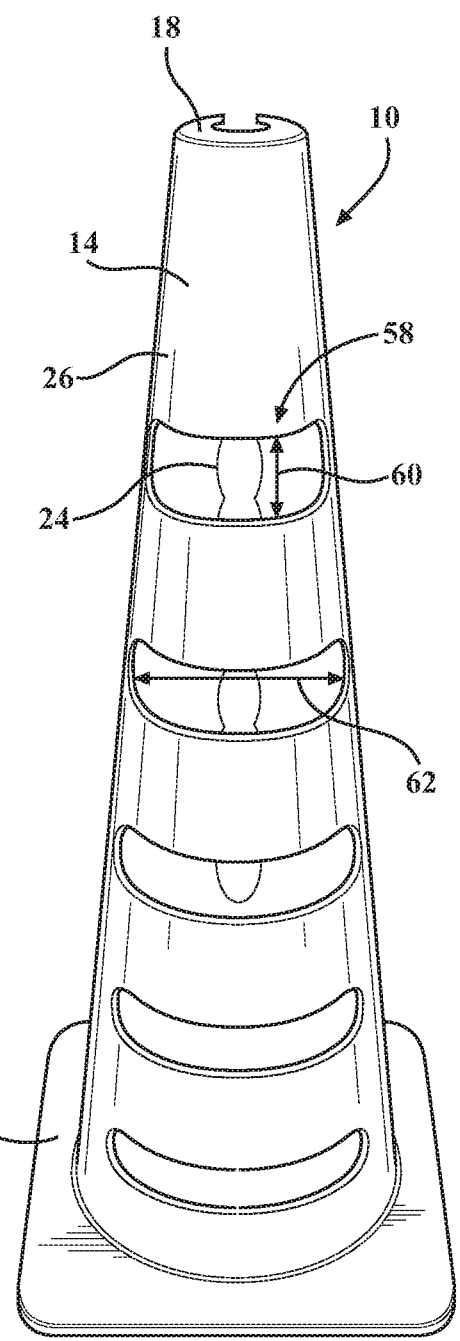
FIG. 2 is a rear view of the same embodiment showing horizontal slots.

FIG. 1 depicts a front view of a playground cone 10 according to the present disclosure. The playground cone 10 may be molded from vinyl or other plastic material. The playground cone 10 includes a base portion 12 and a frustoconical portion 14 that extends upwardly from the base portion 12 to a top 18. The frustoconical portion 14 may define a hollow, interior section 16. The frustoconical portion 14 further includes a slot 24 defined in a wall 26. The slot may be a vertical slot 24 as shown in FIG. 1 and/or one or more horizontal slots 58 as shown in FIG. 2. The top 18 of the frustoconical portion 14 further defines a hole 20. The hole 20 may be defined such that a playground hoop may extend through the hole 20. Stated differently, the hole 20 defines a diameter 22 that provides clearance for the tubing of the playground hoop (not shown).

In an exemplary embodiment, the slot 24, defined in the wall 26, extends from the top 18 to a point spaced at predetermined distance 30 away from the base portion 12 such that the slot 24 is not defined along an entirety of the wall 26 of the frustoconical portion 14. The slot 24 defines a length 32 that is predetermined to accommodate large diameter playground hoops such that the playground hoop is supported within the slot 24 by the frustoconical portion 14 and held in a desired location relative to the ground.

The wall 26 defines the slot 24 having a width 28 adapted to secure a playground hoop. The width 28 may be a constant width 28 in an immediate area where the top 18 mates with the wall 26. The slot 24 otherwise has a unique, useful shape that may be conceived of or described in a number of ways. On the one hand, the slot 24 has a perimeter of arcs joining end-to-end as they extend around the perimeter. One can also describe the slot 24 as including a plurality of oval-shaped holes 34, or scallops 34 defined along the length 32 of the slot 24 below that segment of constant width. The plurality of oval-shaped holes 34 extend in a series such that a bottom end 36 of one oval 38 overlaps a top end 40 of another 42 along the length 32 of the slot 24.

Stated differently, the plurality of oval-shaped holes 34 may be undulating, and have rippled or scalloped or arcing edges 44 formed by curved sections 46 interconnected at peaks 48 disposed within the width 28 of the slot 24. The plurality of oval-shaped holes 34 may be interconnected at the peaks 48 along the length 32 of the slot 24. The curved sections 46 and peaks 48 of the undulating edges 44 further allow the playground cone 10 to adjust a height (not shown) of the playground hoop secured within the slot 24 relative to the base portion 12. For example, the undulating edges 44 of the slot 24 allow the playground hoop to be secured within the slot 24 at various heights defined according to each of the oval-shaped holes 34 of the slot 24.

The undulating edges 44 enlarge and reduce the width 28 of the slot 24 at the peaks 48. The peaks 48 are repeating points within the slot 24 so that larger and smaller diameter playground hoops within the above stated range can be held securely within the slot 24. The repeating, undulating edges 44 are flexible to allow the peaks 48 to flex or deflect from a force when a person inserts a playground hoop into the slot 24, further securing the playground cone 10 and playground hoop, and allowing the playground hoop to be secured at various heights. The repeating edges 44 offer further functionality by eliminating a need for multiple playground cones 10 to support a single playground hoop. Therefore, the slot 24, and more specifically the undulating edges 44 of the oval-shaped holes 34, allow a single playground cone 10 to secure a playground hoop to be used in a physical education activity.

The vertical slot 24 can also support an elongated crossbar in addition to a hoop. Each peak 48 provides a ledge 50 on which such typical playground crossbars can be supported. For example, the curved sections 46 define a width 52 being greater than a diameter of the playground crossbar, while each peak 48 is disposed symmetrically across the slot 24 to define a width 54 less than a diameter of the playground crossbar such that the playground crossbar rests on each peak 48 when inserted into one of the plurality of oval-shaped holes 34. Therefore, the slot 24 allows a playground crossbar to function as a hurdle obstacle when configured with multiple cones.

Referring to FIG. 2, a back view of the playground cone 10 is depicted. The frustoconical portion 14 of the playground cone 10 may further define a plurality of horizontal slots 58. The horizontal slots 58 may be spaced from the vertical slot 24 on the wall 26 of the frustoconical portion 14. Specifically, as shown in FIGS. 1 and 2, the horizontal slots 58 are disposed symmetrically across the wall 26 from the vertical slot 24. This allows the playground cone 10 to provide functionality for more than a single activity. For example, as described above, the vertical slot 24 with the plurality of oval-shaped holes 34 may be adapted to secure a playground hoop on the frustoconical portion 14 vertically, while the horizontal slots 58 may be adapted to secure a hoop or playground crossbar. Therefore, the horizontal slots 58 in combination with the vertical slot 24 allow the playground cone 10 to provide added functionality during use.

The horizontal slots 58 are disposed between the base 12 and the top 18. Specifically, the horizontal slots 58 are spaced evenly on the wall 26 of the frustoconical portion 14 between the base 12 and the top 18. In at least one other embodiment, the horizontal slots 58 may be spaced such that a space between each of the horizontal slots 58 may increase in thickness as the horizontal slots 58 ascend or descend the wall 26. The horizontal slots 58 define a height 60 adapted to secure a playground hoop or crossbar. For example, similar to the curved sections 46 of the oval-shaped holes 34 of the vertical slot 24, the height 60 of the horizontal slots 58 may be greater than the diameter of the playground crossbar or diameter of the playground hoop tubing.

This allows the playground crossbar or playground hoop to be secured, or rest within the horizontal slot 58 defined on the wall 26 of the frustoconical portion 14 of the playground cone 10. Additionally, the horizontal slots 38 may define a length 62. The length 62 of each of the horizontal slots 58 may decrease in ascending order. For example, the bottommost horizontal slot 58 may define a length 62 being greater than any other horizontal slot 58, and the topmost horizontal slot 58 may define a length 62 being less than any other horizontal slot 58. Again, the cascading horizontal slots 58 allow the playground cone 10 to define a variety of obstacle heights. For example, to increase a difficulty of an obstacle or activity, a playground crossbar or hoop may be secured in the topmost horizontal slot 58 rather than the bottommost horizontal slot 58, with each other horizontal slot 58 in-between providing a different degree of difficulty for the obstacle. In at least one other embodiment, the horizontal slots 58 may all define the same length 62.

FIGS. 3-6 depict the playground cone 10 being used with the playground hoop and crossbar. Specifically, FIGS. 3 and 4 depict the playground cone 10 as supporting a playground hoop 64 within the vertical slot 24 at different heights, in which the playground hoop 64 is secured within different, oval-shaped holes 34 defined in the vertical slot 24. FIGS. 3 and 4 further depict the ability of the playground cone 10, and specifically the frustoconical portion 14, to maintain the playground hoop 64 within the vertical slot 24 using a single playground cone 10. FIG. 3 depicts an instance where the playground hoop 64 is secured within the entire vertical slot 24, in which the playground hoop 64 is at the lowest possible height within the vertical slot 24. FIG. 4 depicts an instance where the playground hoop 64 is secured within the vertical slot 24 close to the top 18 of the playground cone 10, in which the playground hoop 64 is supported within the vertical slot 24 such that the playground hoop 64 is elevated to increase the difficulty of an obstacle. A weight 68 provides stability and ballast to prevent the playground hoop and cone from toppling.

FIG. 5 depicts playground cones 10 securing the playground hoop 64 in a horizontal slot 58. Again, as shown in FIG. 5, the horizontal slots 58 of each of the playground cones 10 may be adapted to secure the playground hoop 64 between each of the playground cones 10. While depicted in FIG. 5 as a single playground hoop 64, multiple playground hoops 64 may be secured in any of the horizontal slots 58 on the frustoconical portion 14 to increase or change the activity.

FIG. 6 depicts a playground crossbar 66 disposed within a horizontal slot 58 of the frustoconical portion 14 of the playground cone. Again, as described above, each of the horizontal slots 58 defined in the frustoconical portion 14 of the playground cone 10 may be adapted to secure a playground crossbar 66. Therefore, while depicted in FIG. 6 as the topmost horizontal slot 58 securing the playground crossbar 66, each of the other horizontal slots 58 may be adapted to secure a playground crossbar 66 such that multiple playground crossbars 66 are secured by frustoconical portion 14 of the playground cone 10, depending on the activity being created by the playground cone 10.

Figure 7:
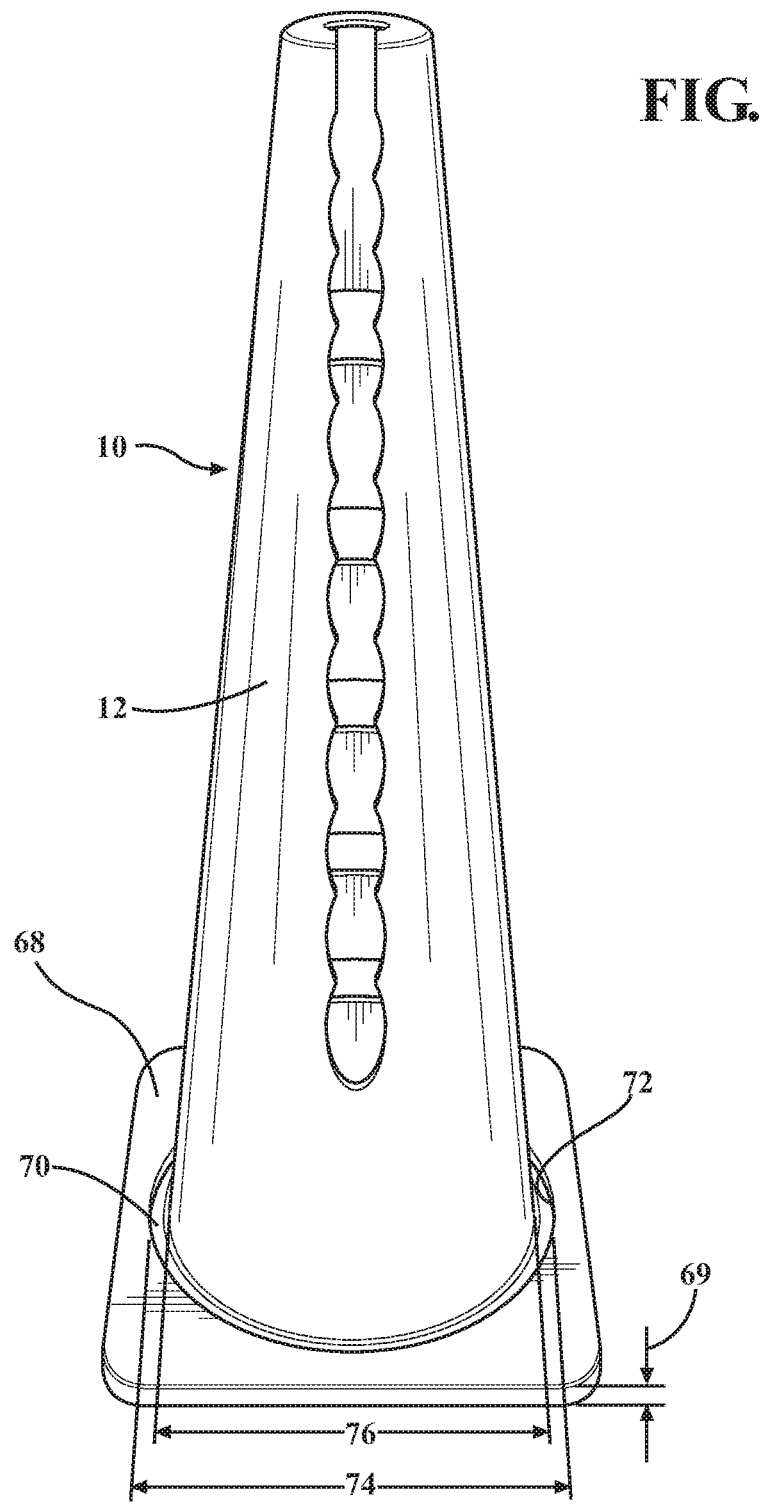
FIG. 7 is a front perspective view of the same embodiment of the invention additionally including the weight adapted to support the cone.
Figure 8:
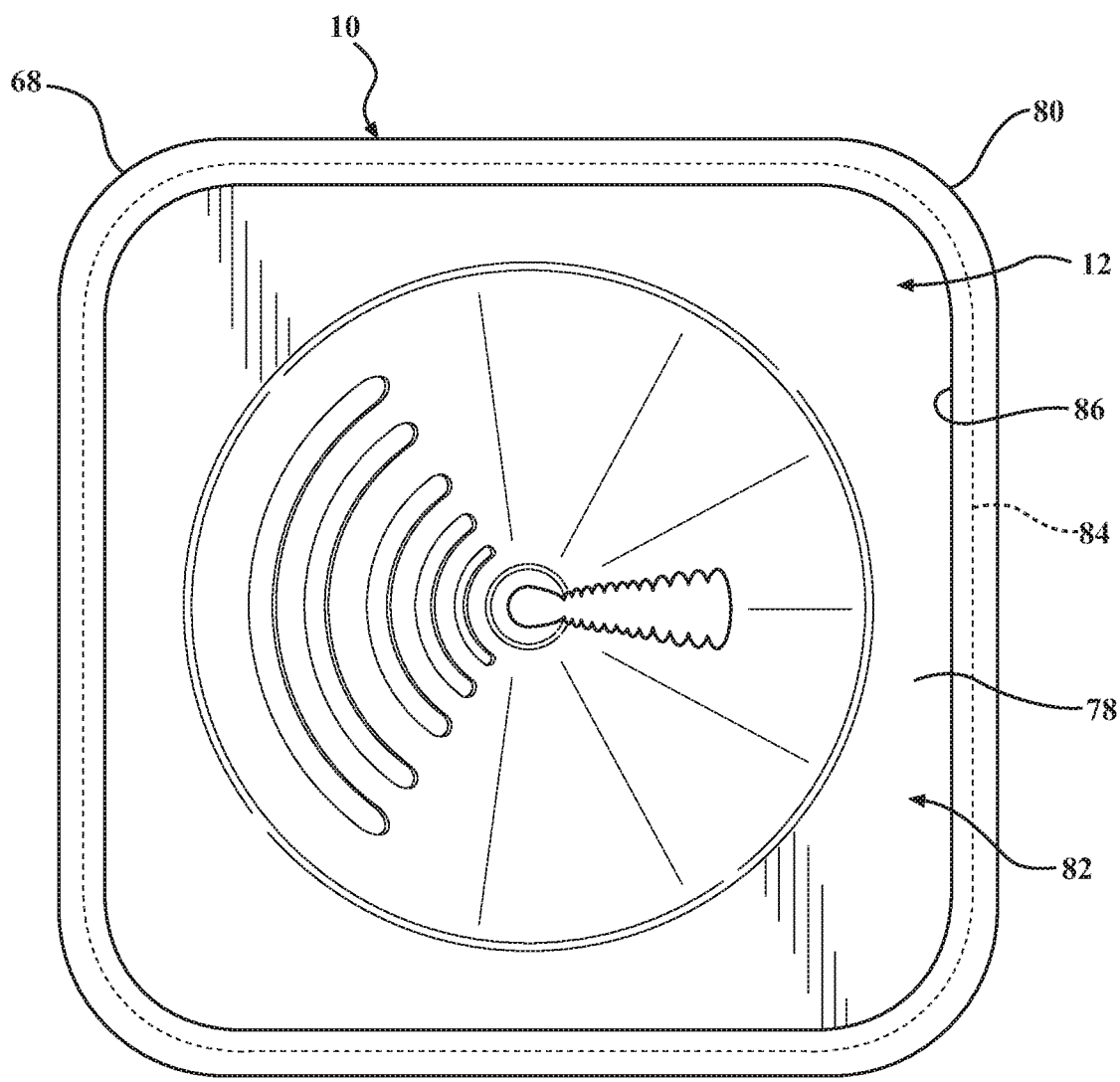
FIG. 8 is a bottom view of the same embodiment of the invention showing the weight secured to the cone.

Referring to FIGS. 7 and 8, a weight 68 is depicted, and it is adapted to provide ballast and stability to the playground cone 10. FIG. 7 depicts the weight 68 disposed on the base portion 12 of the playground cone 10. FIG. 8 depicts an underside of the playground cone 10 with the weight 68 disposed over and attached to the base portion 12 of the playground cone 10. The weight 68 may be substantially rectangular with a circular opening to fit around the base portion 12 of the playground cone 10. The weight 68 may be composed of an elastomeric material that defines a thickness 69 adapted to provide added weight to the base portion 12 of the playground cone 10. Adding weight to the base portion 12 of the playground cone 10 further aids to maintain an upright position of the playground cone 10 during use. In at least one other embodiment, the weight 68 may be composed of a substantially rigid material having sufficient material properties to provide stability to the playground cone 10, or may define a tubular-type space filled with a liquid or other material having sufficient material properties to provide stability to the playground cone 10.

As shown in FIG. 7, the weight 68 is configured to rest on an upper surface 70 of the base portion 12 of the playground cone 10. The weight 68 defines a circular opening 72 adapted to receive the frustoconical portion 14 of the playground cone 10. Stated differently, the weight 68 is adapted such that the frustoconical portion 14 of the playground cone 10 extends through the opening 72 defined by the weight 68 so the weight 68 sits on the upper surface 70 of the base portion 12. Therefore, the opening 72 defined in the weight 68 defines a diameter 74 being greater than a largest diameter 76 of the frustoconical portion 14 of the playground cone 10. Again, allowing the weight 68 to sit on the upper surface 70 of the base portion 12 provides the playground cone 10 with sufficient stability and ballast during use in an activity such as an obstacle course with the playground hoop and crossbar secured within the playground cone 10 as described above.

FIG. 8 depicts a lower surface 78 of the base portion 12 of the playground cone 10. As shown in FIG. 8, the weight 68 is adapted to extend over the upper surface 70 of the base portion 12 to the lower surface 78 of the base portion 12. A perimeter 80 of the weight 68 is greater than a perimeter 82 of the base portion to allow the weight 68 to wrap around the base portion 12 and engage the lower surface 78 of the base portion 12. The weight 68 engages edges 84 of the base portion 12 to secure the weight 68 to the base portion 12 of the playground cone 10. Specifically, the edges 84 of the base portion 12 engage a groove 86 defined in the weight 68 to secure the weight 68 to the base portion 12. Securing the weight 68 to the base portion 12 through the groove 86 allows the weight 68 to be used without shifting or causing imbalance in the playground cone 10. The weight 68 provides stability and ballast to the playground cone 10 during use of the playground cone 10.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A playground cone comprising:
   a flat base portion; and
   a hollow frustoconical portion extending upwardly from the base portion toward a top;
   the frustoconical portion defining an elongated slot having different length and width dimensions and extending from a first end to a second end, the slot being sized and adapted to receive a circular playground hoop, and to support the playground hoop in a predetermined orientation relative to the base portion, wherein the slot is a vertical slot, with the frustoconical portion defining a series of oval-shaped holes oriented in a vertical direction, the oval-shaped holes each including a bottom end and a top end, with the bottom end of one oval overlapping the top end of another to define the vertical slot extending from a predetermined distance above the base portion to the top, whereby the cone can support the hoop in a predetermined number of vertical positions by inserting the hoop into the slot,
   the frustoconical portion further including a plurality of horizontal slots each having a predetermined height dimension sized to receive the playground hoop, the horizontal slots further extending parallel to one another between the top and the base portion, and being spaced evenly from each other, where the horizontal slots decrease in length along the frustoconical portion from the base portion to the top.

2. The playground cone as set forth in claim 1 further comprising a weight adapted to rest on the base portion of the cone in order to provide stability to the cone.

3. The playground cone as set forth in claim 2 wherein the weight defines an opening for receiving the frustoconical portion of the cone.

4. The playground cone as set forth in claim 2 wherein the weight is adapted to extend around the flat base portion such that edges of the base portion engage a groove defined in the weight to secure the weight to the base portion.

* * * * *